(12) United States Patent
Tian et al.

(10) Patent No.: US 8,503,328 B2
(45) Date of Patent: Aug. 6, 2013

(54) METHODS AND APPARATUS FOR TRANSMISSION OF CONFIGURATION INFORMATION IN A WIRELESS COMMUNICATION NETWORK

(75) Inventors: Bin Tian, San Diego, CA (US); Judd Erlenbach, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1936 days.

(21) Appl. No.: 10/932,456

(22) Filed: Sep. 1, 2004

(65) Prior Publication Data

US 2006/0045040 A1    Mar. 2, 2006

(51) Int. Cl.
*H04L 12/28* (2006.01)
*H04B 7/212* (2006.01)
*H04J 3/00* (2006.01)

(52) U.S. Cl.
USPC ........... 370/254; 370/321; 370/337; 370/347; 370/443; 370/444

(58) Field of Classification Search
USPC .................. 370/321, 337, 347, 443, 444, 254
See application file for complete search history.

(56) References Cited

U.S. PATENT DOCUMENTS

| | | | |
|---|---|---|---|
| 5,303,240 A | 4/1994 | Borras et al. | |
| 5,383,164 A | 1/1995 | Sejnowski et al. | |
| 5,551,059 A | 8/1996 | Hutcheson et al. | |
| 5,559,865 A | 9/1996 | Gilhousen | |
| 5,640,166 A | 6/1997 | Siwiak | |
| 5,757,285 A | 5/1998 | Grabow et al. | |
| 5,844,522 A | 12/1998 | Sheffer et al. | |
| 6,088,828 A | 7/2000 | De Bart et al. | |
| 6,111,865 A * | 8/2000 | Butler et al. | 370/335 |
| 6,141,335 A | 10/2000 | Kuwahara et al. | |
| 6,175,588 B1 | 1/2001 | Visotsky et al. | |
| 6,188,913 B1 | 2/2001 | Fukagawa et al. | |
| 6,263,497 B1 | 7/2001 | Maeda et al. | |
| 6,339,697 B1 | 1/2002 | Ranta | |
| 6,377,802 B1 | 4/2002 | McKenna et al. | |
| 6,564,060 B1 | 5/2003 | Hoagland | |

(Continued)

FOREIGN PATENT DOCUMENTS

| | | |
|---|---|---|
| CN | 1184561 A | 6/1998 |
| DE | 10004000 | 8/2001 |

(Continued)

OTHER PUBLICATIONS

Agrawal, P. et al. "An Adaptive Power Control and Coding Scheme for Mobile Radio Systems," IEEE International Conference on Personal Wireless Communications, New Delhi, India, Feb. 19-21, 1996. XP010158329. pp. 283-288.

(Continued)

*Primary Examiner* — Wesley Kim
(74) *Attorney, Agent, or Firm* — Gerald P. Joyce, III (57) ABSTRACT

Methods and apparatus for transmission of configuration information in a wireless communication network. A method is provided for transmitting a configuration message to a plurality of terminals in a wireless network. The method includes assigning a slot in a transmission to contain the configuration message, and transmitting a marker to identify the slot in the transmission to the plurality of terminals. The method also includes transmitting the configuration message in the slot of the transmission using a high data rate so that air-link resources are conserved.

10 Claims, 5 Drawing Sheets

U.S. PATENT DOCUMENTS

| | | |
|---|---|---|
| 6,680,967 B1 | 1/2004 | Westman |
| 6,768,913 B1 | 7/2004 | Molnar et al. |
| 6,862,326 B1 | 3/2005 | Eran et al. |
| 6,950,064 B2 | 9/2005 | Schantz |
| 6,963,745 B2 | 11/2005 | Singh et al. |
| 7,035,214 B1 | 4/2006 | Seddigh et al. |
| 7,042,858 B1 | 5/2006 | Ma et al. |
| 7,058,401 B1 | 6/2006 | Sinivaara et al. |
| 7,123,593 B1* | 10/2006 | Marque-Pucheu et al. ... 370/324 |
| 7,187,940 B2 | 3/2007 | Kelley |
| 7,236,515 B1 | 6/2007 | Pope |
| 7,301,990 B2 | 11/2007 | Jayaraman et al. |
| 7,315,588 B2 | 1/2008 | Hessel |
| 7,379,750 B2 | 5/2008 | Jalali |
| 7,558,576 B2 | 7/2009 | Chen et al. |
| 7,610,025 B2 | 10/2009 | Fernandez-Corbaton et al. |
| 7,684,802 B2 | 3/2010 | Jalali |
| 7,933,599 B2 | 4/2011 | Fernandez-Corbaton et al. |
| 2002/0025811 A1* | 2/2002 | Willey .................. 455/434 |
| 2002/0051442 A1* | 5/2002 | Lee et al. .............. 370/345 |
| 2002/0137538 A1 | 9/2002 | Chen et al. |
| 2002/0150075 A1* | 10/2002 | Belcea ................ 370/347 |
| 2002/0166097 A1 | 11/2002 | Persson et al. |
| 2002/0173269 A1 | 11/2002 | Grayson et al. |
| 2003/0069043 A1 | 4/2003 | Chhaochharia et al. |
| 2003/0099215 A1 | 5/2003 | OShea |
| 2003/0099356 A1 | 5/2003 | Fujino et al. |
| 2003/0126066 A1 | 7/2003 | Nunes et al. |
| 2003/0142739 A1 | 7/2003 | Shiozawa |
| 2004/0014431 A1 | 1/2004 | Lo |
| 2004/0092280 A1* | 5/2004 | Lee .................. 455/515 |
| 2004/0101074 A1 | 5/2004 | Wilson |
| 2004/0174298 A1 | 9/2004 | Eriksson |
| 2004/0179544 A1 | 9/2004 | Wilson et al. |
| 2004/0248519 A1 | 12/2004 | Niemela |
| 2004/0259556 A1 | 12/2004 | Czys |
| 2005/0071877 A1 | 3/2005 | Navarro |
| 2005/0111405 A1 | 5/2005 | Kanterakis |
| 2005/0143118 A1 | 6/2005 | Bernhardsson et al. |
| 2005/0148370 A1 | 7/2005 | Moldoveanu et al. |
| 2005/0157684 A1 | 7/2005 | Ylitalo et al. |
| 2005/0164655 A1 | 7/2005 | Nakao et al. |
| 2005/0276247 A1 | 12/2005 | Heiman et al. |
| 2010/0008453 A1 | 1/2010 | Fernandez-Corbaton et al. |

FOREIGN PATENT DOCUMENTS

| | | |
|---|---|---|
| EP | 0862343 A2 | 9/1998 |
| EP | 0932319 A2 | 7/1999 |
| EP | 1041850 | 10/2000 |
| EP | 1069706 A1 | 1/2001 |
| EP | 1239615 A1 | 9/2002 |
| EP | 1458205 A2 | 9/2004 |
| GB | 2393077 | 3/2004 |
| JP | 10070502 A | 3/1998 |
| JP | 10256971 A | 9/1998 |
| JP | 11266232 A | 9/1999 |
| JP | 2000501907 A | 2/2000 |
| JP | 2001094496 A | 4/2001 |
| JP | 2001308828 A | 11/2001 |
| JP | 2005039552 A | 2/2005 |
| TW | 465204 | 11/2001 |
| TW | 493321 | 7/2007 |
| WO | 9608850 | 3/1996 |
| WO | 9630964 A1 | 10/1996 |
| WO | 9637973 A1 | 11/1996 |
| WO | 9721284 A1 | 6/1997 |
| WO | 0118986 A1 | 3/2001 |
| WO | 0209305 | 1/2002 |
| WO | 0249150 A2 | 6/2002 |
| WO | 02054818 | 7/2002 |
| WO | 03081938 A1 | 10/2003 |
| WO | WO 03/092320 | 11/2003 |
| WO | 2004062177 A2 | 7/2004 |
| WO | 2005013525 A1 | 2/2005 |

OTHER PUBLICATIONS

Argentina OA dated Feb. 11, 2010 for U.S. Application Serial No. P 06 01 01233, 2 pages.

Austin M.D., et al., "Velocity adaptive handoff algorithms for microcellular systems", IEEE Transactions on Vehicular Technology, IEEE Service Center, Piscataway, NJ, US, Aug. 1, 1994, pp. 549-561, p. 549, left-hand column, paragraph 1-p. 550, right-hand column, paragraph 2, http://ieeexplore. ieee.org/xpls/abs_all. Jspar number=312791.

International Search Report and Written Opinion—PCT/US2005/031553, International Search Authority—European Patent Office—Mar. 27, 2006.

Jones J.W., et al., "A Timed-Shared Digital Filter Realization", IEEE Transactions on Computers, IEEE Inc. New York, US, vol. C-18, No. 11, Nov. 1969 pp. 1027-1030, XP000760795, ISSN: 0018-9340.

* cited by examiner

METHODS AND APPARATUS FOR TRANSMISSION OF CONFIGURATION INFORMATION IN A WIRELESS COMMUNICATION NETWORK

BACKGROUND

1. Field

The present invention relates generally to configuring terminals to operate in a wireless network, and more particularly, to methods and apparatus for efficiently broadcasting a configuration message to terminals in a wireless data network.

2. Description of the Related Art

Wireless communication systems typically allow a large number of wireless terminals to communicate with each other via one or more hubs (also referred to as base stations or gateways) that communicate with a selected number of terminals in a geographic region. Each hub generally must broadcast a system configuration message to all terminals in its geographic area that intend to communicate over the network. The configuration message contains important system parameters that are used by the terminals to access the network. The terminals must be able to receive this configuration message in order to obtain the transmitted system parameters. Generally, the contents of the configuration message do not change very often.

Because the configuration message is targeted for all terminals in the geographic region of a particular transmitting hub, traditional systems transmit this message using the lowest data rate available, so that terminals located in poor receiving portions of the geographic region can receive enough signal energy to demodulate the message. Additionally, the configuration message may be repeatedly broadcast so that when a terminal is first powered-on, it will eventually receive the message.

Unfortunately, because conventional systems transmit the configuration message at the lowest data rate, the transmission may consume a significant portion of the available air-link resources if it is broadcasted too frequently. On the other hand, if it is broadcasted less frequently, a terminal that has just been powered-on will have to wait a longer period of time to receive and demodulate the message, which may result in a configuration delay that is inconvenient to the terminal user.

Therefore, what is needed is an efficient way to transmit a configuration message to a plurality of terminals in a wireless communication network so that all intended receiving terminals will receive enough signal energy to decode the message, while conserving air-link resources and minimizing configuration delays.

SUMMARY

In one or more embodiments, a configuration transmission system comprising methods and apparatus is provided to allow a configuration message to be efficiently transmitted to a number of terminals in a wireless network. The configuration message contains system parameters that are used to configure the terminals to communicate over the wireless network. The system is especially well suited for use in network environments where the signal energy and/or signal-to-noise ratio (SNR) of a transmission received at the terminals may have large variations from terminal to terminal.

In one embodiment, a communication network hub periodically transmits a configuration message at a high data rate during an identified time interval. Since the configuration message is transmitted at a high data rate, the amount of time used to transmit the message is minimized so that precious air-link resources are conserved. Furthermore, by periodically transmitting the configuration message, the system minimizes configuration delays because when a terminal is first powered-on it will not have to wait very long before receiving the next transmission of the message.

The operation of the system assures that terminals receiving the configuration message with low SNR levels will still be able to decode the message by coherently combining symbols received from multiple transmissions of the configuration message. For example, receiving terminals that are located in remote parts of the network or located near large obstructions may experience such low SNR levels that the configuration message cannot be accurately demodulated after only one reception of the message. However, because the configuration message is repeatedly transmitted at identified time intervals, symbols from multiple receptions of the configuration message are combined to allow the message to be accurately demodulated. As a result, the transmission system efficiently utilizes precious air-link resources while minimizing the configuration delay experience by receiving terminals.

In one embodiment, a method is provided for transmitting a configuration message to a plurality of terminals in a wireless network. The method comprises assigning a slot in a transmission to contain the configuration message, and transmitting a marker to identify the slot in the transmission to the plurality of terminals. The method also comprises transmitting the configuration message in the slot of the transmission using a high data rate so that air link resources are conserved.

In another embodiment, a server is provided that operates to transmit a configuration message to a plurality of terminals in a wireless network. The server comprises processing logic that operates to assign a slot in a transmission from the server to contain the configuration message, and slot identification logic that operates to generate a marker that identifies the slot. The server also comprises transmitting logic that operates to transmit the marker and transmit the configuration message in the slot of the transmission using a high data rate so that air link resources are conserved.

In still another embodiment, a server is provided that operates to transmit a configuration message to a plurality of terminals in a wireless network. The server comprises means for assigning a slot in a transmission from the server to contain the configuration message; and means for transmitting a marker to identify the slot in the transmission to the plurality of terminals. The server also comprises means for transmitting the configuration message in the slot of the transmission using a high data rate so that air link resources are conserved.

In still another embodiment, a computer-readable media is provided comprising instructions, which when executed by a processor in a server, operate to transmit a configuration message to a plurality of terminals in a wireless network. The computer-readable media comprises instructions for assigning a slot in a transmission from the server to contain the configuration message, and instructions for transmitting a marker to identify the slot in the transmission to the plurality of terminals. The computer-readable media also comprises instructions for transmitting the configuration message in the slot of the transmission using a high data rate so that air link resources are conserved.

In still another embodiment, a method is provided for operating a terminal to receive a configuration message transmitted in a wireless network. The method comprises detecting a transmitted marker that identifies a selected time slot in a transmission, and receiving symbols representing the configuration message that have been transmitted during the selected time slot using a high data rate so that air link resources are conserved. The method also comprises combining the symbols with stored symbols to form combined symbol values, where the stored symbol values represent prior symbols received from one or more prior transmissions of the configuration message, and decoding the combined symbol values to produce the configuration message.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a configuration transmission system that includes methods and apparatus for transmitting a configuration message to a plurality of receiving terminals in a wireless communication network. For example, in one embodiment, the configuration message comprises configuration parameters that are used to initialize the terminals to allow the terminals to operate on the wireless network.

It will be assumed for the following description that the wireless network operates to transmit information in one or more time slots. For example, the network may utilize a time division technology where transmission of information is partitioned into one or more time slots. However, it should be understood that embodiments of the described transmission system are not particularly limited to any transmission technology and that embodiments of the system could be used to transmit configuration information to terminals operating in virtually any type of wireless network.

In one or more embodiments of the configuration transmission system, a server (or hub) transmits the configuration message to a plurality of terminals in a wireless network by performing the following functions:

a. Assign a dedicated transmission time slot in which to transmit the configuration message.

b. Transmit an identifier (detectable marker) to the terminals that identifies the assigned transmission time slot.

c. Transmit the configuration message at a high data rate in the assigned time slot so that the transmission time of the configuration message is reduced and/or minimized and air-link resources are conserved d. Update the configuration message with new configuration parameters as necessary.

e. Repeat the transmission of the identifier and the configuration message at periodic or known intervals.

In one or more embodiments of the configuration transmission system, a terminal receives the configuration message transmitted by a server in a wireless network by performing the following functions:

a. Detect a transmitted marker that identifies a selected transmission time slot.

b. Receive and demodulate symbols representing a configuration message that has been transmitted during the selected transmission time slot.

c. Combine the received symbols with stored symbol values to form combined symbol values, where the stored symbol values represent the combined symbols received from one or more prior transmissions.

d. Decode the combined symbol values to determine if a complete configuration message has been received without errors.

e. If errors are not detected, use the configuration parameters in the configuration message to initialize the terminal.

f. If errors are detected, store the newly combined symbol values and return to function "a" to receive the next transmission of the configuration message.

Figure 1:
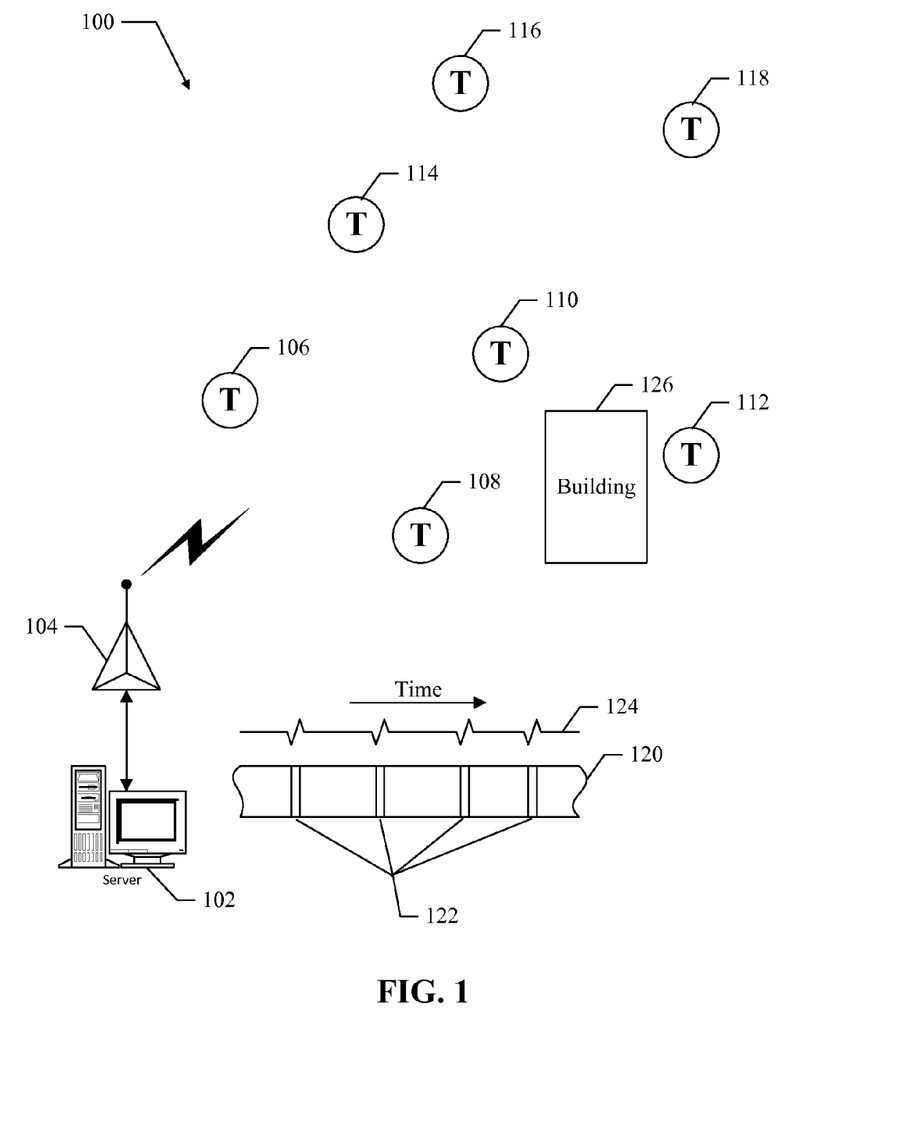
FIG. 1 shows one embodiment of a wireless network that includes one embodiment of a configuration transmission system.

FIG. 1 shows one embodiment of wireless network 100 that includes one embodiment of a configuration transmission system. The network 100 comprises a network server 102 that uses antenna 104 to wirelessly communicate with a plurality of wireless terminals (106-118). The network 100 may be part of any type of wireless network, for example, a CDMA, TDMA, GSM, WCDMA, CDMA2000, or TDS-CDMA wireless communication network.

The terminals (106-118) may comprise any type of wireless terminals, including but not limited to, wireless telephones, PDAs, email devices, pagers, notebook computers, or any other type of device that may communicate over the wireless network 100. The terminals (106-118) are located at various geographic locations with respect to the server 102 and antenna 104. For example, terminals 106 and 108 are located relatively close to the antenna 104, while terminals 116 and 118 are located relatively far away from the antenna 104. Additionally, the building 126 obstructs the transmission path from the antenna 104 to the terminal 112. Thus, transmissions from the antenna 104 may be received with relatively high SNR at the terminals 106 and 108 because these terminals are located close to the transmitting antenna 104. However, transmissions from the antenna 104 may be received with relatively low SNR at the terminals 116 and 118 because these terminals are located relatively far away from the transmitting antenna 104. Furthermore, transmissions from the antenna 104 may be received with relatively low SNR at the terminal 112 because the building 126 obstructs the transmission path to this terminal. As will be described in the following sections, embodiments of the configuration transmission system operate to allow a configuration message to be efficiently transmitted and received by all the terminals (106-118) even though the received SNR from terminal to terminal may vary greatly.

During operation of the network 100, the server 102 transmits information to the terminals (106-118) using a transmission that comprises a plurality of sequential time slots. For example, the information may include voice data, program files, applications or any other type of information that may be transmitted using one or more time slots. In one or more embodiments, the system operates to transmit the configuration parameters to the terminals using one or more time slots. However, for the purpose of clarity, it will be assumed for the rest of this description that the configuration parameters are contained in a configuration message that can be transmitted using just one time slot.

In order to operate on the network 100, each terminal (106-118) typically needs to obtain the configuration parameters to initialize itself at power up. The configuration parameters comprise system parameters that are used to initialize the terminal so that it may operate on the network 100. For example, the configuration information may comprise timing and frequency information. The configuration parameters are contained in a configuration message 122 that is transmitted from the server 102 to the terminals (106-118) as part of a data transmission 120.

The configuration message 122 is transmitted at selected time slots in the transmission 120. For example, in one embodiment, the time slots are selected so that the configuration message is transmitted at periodic intervals of about one second. In one embodiment, the configuration message is transmitted at a high data rate so as to fit within the available time slot and so that the amount of air-link resources used to transmit the message are minimized and/or conserved. In another embodiment, the configuration message is transmitted using a plurality of time slots. For example, multiple time slots may be identified that occur at periodic or known time locations, and the configuration message is transmitted using more than one of the predetermined time slots.

In addition to the configuration message, the system also generates a marker 124 that is transmitted to the terminals to mark the time slot that contains the configuration message. For example, in one embodiment, the marker comprises a phase adjustment to a pilot signal that is used by the communication network. In one embodiment, the phase adjustment inverts the pilot signal so that when terminals receive the inverted pilot signal they know that the associated time slot contains the configuration message.

In one embodiment, the configuration message and marker are repeatedly transmitted from the transmitting network server 102. Because some of the terminals experience high SNR, (i.e., due to their proximity to the antenna 104) it is possible for these terminals to accurately demodulate the message after only one reception. However, because the message is repeatedly transmitted, it is possible for terminals that experience low SNR (i.e., due to distance or obstruction) to coherently combine symbols from multiple receptions of the message so that the message can be accurately decoded. Thus, depending on the receiving conditions at each terminal, the configuration message will be accurately decoded as soon as enough symbols have been received and combined to sufficiently improve the SNR. As a result, the system operates to efficiently transmit the configuration message to the wireless terminals so that air-link resources are conserved and configuration delays are minimized.

Figure 2:
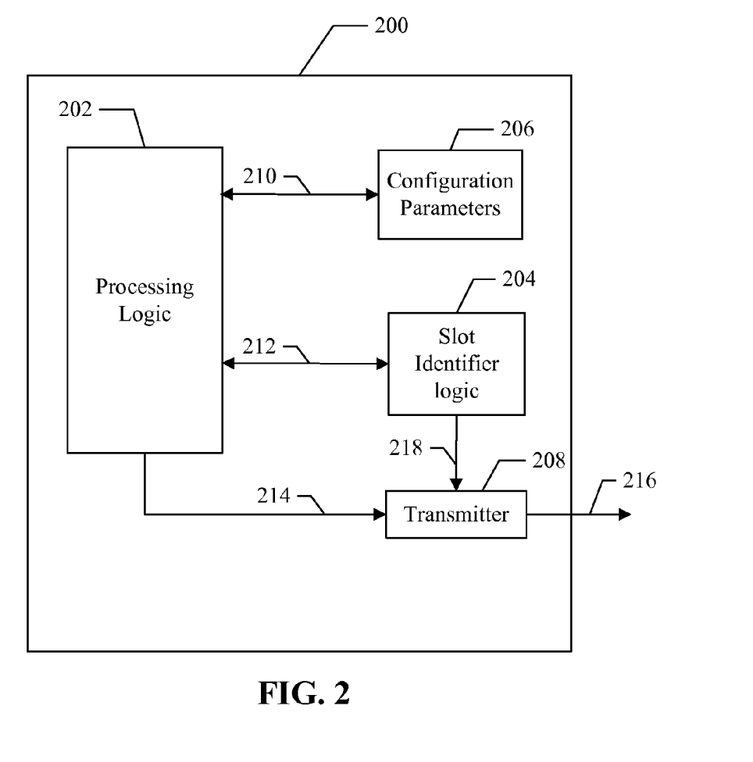
FIG. 2 shows one embodiment of a server that operates to transmit a configuration message in one embodiment of a configuration transmission system.

FIG. 2 shows one embodiment of a server 200 that operates to transmit a configuration message in one embodiment of a configuration transmission system. The server 200 comprises processing logic 202, slot identifier logic 204, configuration parameters 206 and a transmitter 208. It should be understood that the elements of the server 200 shown in FIG. 2 represent just one embodiment, and that implementation of the server 200 could be achieved in one of any number of ways using greater or fewer functional elements. For example, some or all of the function elements shown could be implemented in hardware and/or in a computer program executed by one or more processors.

The processing logic 202 may comprise a processor, CPU, gate array, logic, discrete circuitry, software, or any combination of hardware and software. The processing logic 202 operates to assign a time slot in a transmission to be used to transmit a configuration message. The processing logic also operates to assemble the configuration message to contain the configuration parameters 206. The processing logic 202 retrieves the configuration parameters 206 via communication link 210.

The configuration parameters 206 comprise system parameters that are used to initialize terminals operating on a wireless network. The configuration parameters 206 may be stored in any type of suitable storage media.

The slot identifier logic 204 may comprise a processor, CPU, gate array, logic, discrete circuitry, software, or any combination of hardware and software. The slot identifier logic 204 receives information about the assigned time slot from the processing logic 202 via the link 212. The slot identifier logic 204 uses the received information to generate a marker (or indicator) that marks the location of a time slot that is assigned to contain the configuration message. For example, after the processing logic 202 identifies a time slot for use in transmitting a configuration message, the location of the selected time slot is communicated to the slot identifier logic 204 via the link 212. The slot identifier logic 204 generates a marker at the location of the selected time slot. For example, in one embodiment, the marker is an inverted pilot signal, however, any suitable type of marker may be used to indicate the location of the time slot that contains the configuration message.

The transmitter 208 comprises any logic suitable to wirelessly transmit information from the server to terminals. The transmitter 208 receives the configuration message from the processing logic 202 via link 214, and the marker from the slot identifier logic 204 via the link 218. The transmitter 208 transmits the marker and configuration message to one or more receiving terminals that are part of the wireless network. The transmitter transmits both the marker and the configuration message to the terminals, so that the marker may be used by the terminals to indicate the slot location of the configuration message. Thus, the receiving terminals are able to receive and detect the transmitted marker to discover the slot location of the configuration message, which is then received and demodulated.

In one embodiment, the server 200 continually repeats the transmission of the marker and configuration message so that receiving terminals, which are unable to accurately decode the message after one reception, may receive the message one or more additional times and combine the received message symbols until the SNR is sufficiently increased to accurately decode the message. Furthermore, the processing logic 202 may update the configuration parameters 206 contained in the configuration message at any time via the link 210. In the case where the configuration parameters in the configuration message are updated, the new configuration parameters will appear in a subsequent transmission of the configuration message. The receiving terminals that have begun demodulating the older configuration message will need to receive enough transmissions of the new message to accurately decode the new parameters.

In one embodiment, the server 200 operates as the result of the execution of instructions stored in a memory to perform the functions described herein. For example, the memory may be part of the processing logic 202. The instructions may be stored in the memory during manufacture of the server 200. In one embodiment, the instructions are stored on a computer-readable media, such as a floppy disk, hard disk, CDROM, flash memory, or any other type of computer-readable media. The instructions on the computer-readable media may be retrieved and executed by the processing logic 202. In one embodiment, the instructions are downloaded from the computer-readable media into the server 200 and stored in the memory for later execution. Thus, in one embodiment, the server 200 operates to execute instructions stored on a computer-readable media to perform the functions described herein.

It should be noted that the implementation of the server 200 is just one embodiment and that changes, additions, deletions, or modifications to the functional elements shown are within the scope of the described embodiments.

Figure 3:
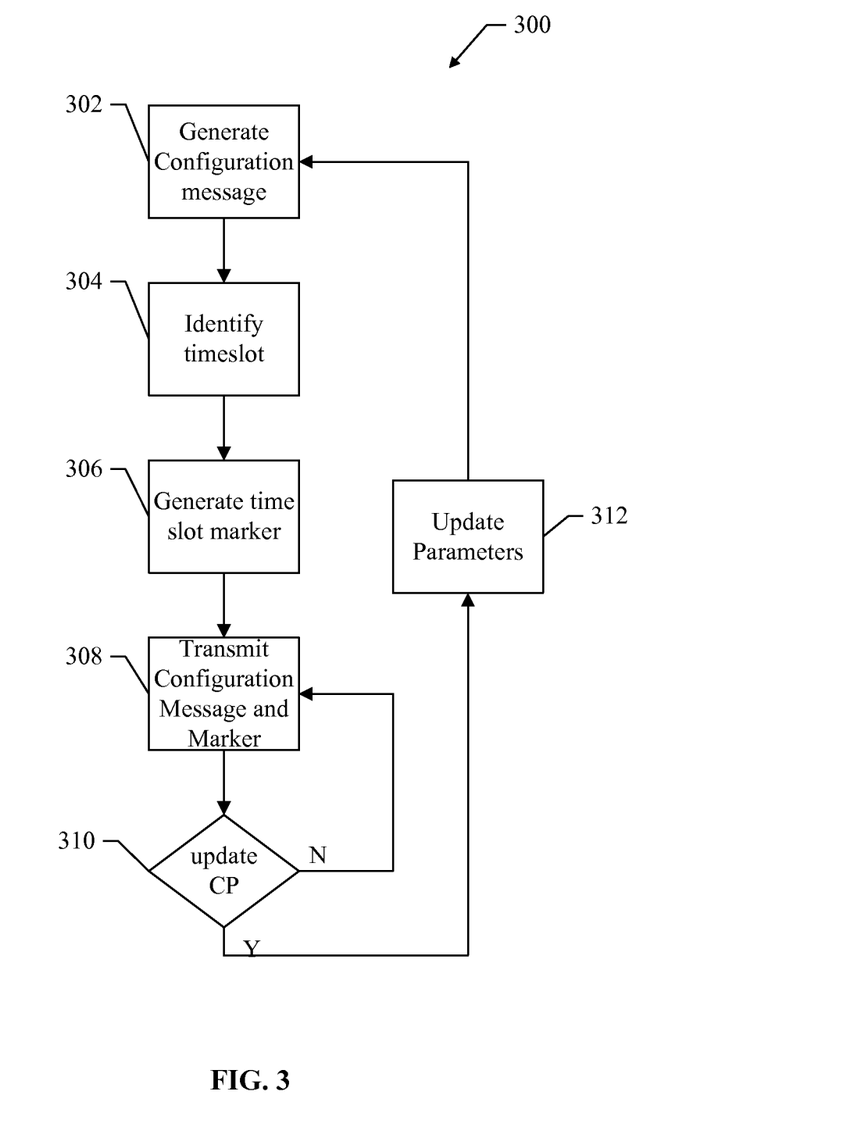
FIG. 3 shows one embodiment of a method for operating a server in one embodiment of a configuration transmission system.

FIG. 3 shows one embodiment of a method 300 for operating a server in one embodiment of a configuration transmission system, for example, the server 200 shown in FIG. 2.

The method begins at block 302 where configuration parameters are determined. The configuration parameters are parameters that are used to initialize terminals in a wireless network. For example, in one embodiment, the processing logic 202 generates the configuration parameters 206 and stores them in a memory device. After the processing logic 202 determines the configuration parameters, the processing logic 202 generates the configuration message that contains those parameters. The configuration message may have any suitable message format and may include error detection encoding. For example, in one embodiment, the processing logic 202 encodes the configuration message using any suitable error detection technique (i.e., CRC).

At block 304, a transmission time slot is assigned which will contain the configuration message. For example, the processing logic 202 assembles information to be transmitted in a transmission to the terminals in a wireless network. The transmission comprises a sequence of time slots having duration in accordance with the transmission technology used by the wireless network. For example, in one embodiment, the transmission comprises 600 slots per second. The processing logic 202 assigns one of the time slots to contain the configuration message and informs the slot identifier logic 204 about the assigned time slot via the link 212. In one embodiment, the processing logic 202 assigns a sequence of slots that result in the configuration message being periodically transmitted.

At block 306, a time slot marker is generated that marks the time slot that is assigned to contain the configuration message. For example, in one embodiment, the slot identifier logic 204 generates an inverted pilot signal that is used to mark the time slot that contains the configuration message.

At block 308, the configuration message and the marker are transmitted to terminals in a wireless network. For example, in one embodiment, the transmitter 208 transmits the configuration message and the marker. In one embodiment, the configuration message is transmitted in the slot using a high data rate that reduces and/or minimizes the transmission time of the configuration message so that air-link resources are conserved. For example, in one embodiment, the configuration message is transmitted at 1024 bits per second.

At block 310, a test is performed to determine if the configuration parameters need to be updated. For example, in one embodiment, the configuration parameters include system parameters that are periodically updated every 15 to 30 minutes. If the parameters do not need to be updated, the method proceeds to block 308 where the configuration parameters and marker at again transmitted at the appropriate time. If the parameters need to be updated, the method proceeds to block 312.

At block 312, the configuration parameters are updated. For example, the processing logic 202 updates the parameters 206 via the link 210. After the parameters are updated, the method proceeds to block 302 where a new configuration message is generated to contain the newly updated configuration parameters. The method then proceeds to transmit the new configuration message and its associated marker according to the above description.

It should be noted that the method 300 describes the operation of one embodiment of a configuration transmission system and that changes, additions, deletions, or rearrangements of the method are within the scope of the described embodiments.

Figure 4:
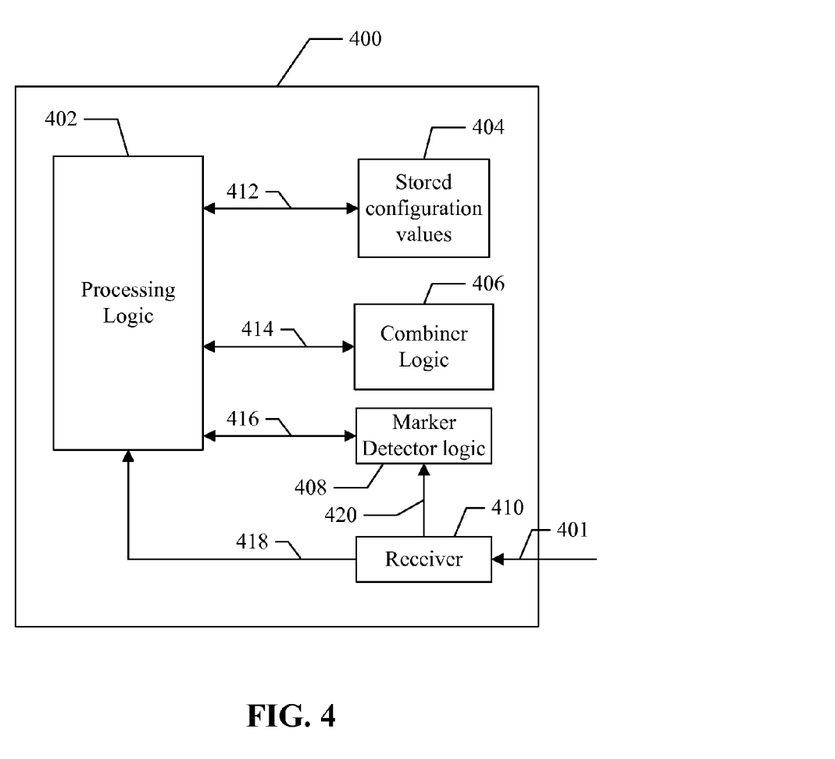
FIG. 4 shows one embodiment of a terminal that operates to receive a configuration message transmitted by a server in one embodiment of a configuration transmission system.

FIG. 4 shows one embodiment of a terminal that operates to receive a configuration message transmitted by a server in one embodiment of a configuration transmission system. The terminal comprises processing logic 402, stored configuration values 404, combiner logic 406, marker detector logic 408, and receiver 410.

The receiver 410 comprises hardware and/or software that operate to receive signals 401 transmitted over a wireless network. For example, the receiver 410 receives signals 401 transmitted from a network server that comprise a marker and a configuration message that is contained in a selected time slot of a received transmission. The receiver 410 operates to forward the received signals to the processing logic 402 and the marker detector logic 408 via the links 418 and 420, respectively.

The marker detector logic 408 comprises any combination of hardware and/or software to detect a marker in the received signal provided by the receiver 410. For example, in one embodiment, the marker comprises an inverted pilot signal that marks a selected time slot in the received data stream. The marker detector logic 408 detects the inverted pilot signal and provides a marker detected signal to the processing logic 402 via the link 416 to indicate that a marker has been detected.

The processing logic 402 may comprise a processor, CPU, gate array, logic, discrete circuitry, software, or any combination of hardware and software. The processing logic 402 operates to demodulate information contained in a transmission received by the receiver 410 and provided to the processing logic 402 via link 418. In one embodiment, the transmission comprises a sequence of time slots where a selected time slot contains a configuration message. The processing logic 402 receives the marker detected signal from the marker detector logic 408 via the link 416 and uses this signal to identify a time slot in the received transmission that contains the configuration message. Once the selected time slot is identified, the processing logic 402 operates to demodulate the information in the time slot to obtain the configuration message. The configuration message contains configuration parameters that are used to initialize the receiver 400 to operate on the wireless network.

In one embodiment, the processing logic is able demodulate the configuration message without errors and stores the associated configuration parameters as the stored configuration parameters 404. These parameters are then used to initialize the receiver 400, and may also have been used to initialize the transmitter as well. In another embodiment, the processing logic 402 is unable to demodulate the configuration message. For example, the SNR of the received signal may be too low to accurately demodulate the configuration message without errors. In this case, the processing logic 402 stores the received configuration symbols in the stored configuration values 404. The processing logic 402 then waits to receive the next transmission of the configuration message.

When the next transmission is received, the processing logic 402 retrieves the stored configuration symbols and sends it to the combiner logic 406, via the link 414, along with the most recently received configuration symbols. The combiner logic 406 comprises any suitable hardware and/or software to combine the stored configuration symbols with the recently received configuration symbols. For example, the combiner may operate to coherently combine the stored configuration symbols with the newly received configuration symbols. The combined configuration symbols are returned to the processing logic 402 via the link 414, where they are decoded to obtain the configuration message. If the configuration message can be accurately decoded without errors, the resulting configuration parameters are stored at the stored configuration values 404 and used to initialize the receiver 400. If the configuration message cannot be accurately decoded from the combined configuration symbols, the combined configuration symbols are stored at the stored configuration values 404 and the processing logic 402 waits to receive another transmission of the configuration message.

The receiver 400 may continue to receive additional transmissions of the configuration symbols, which are combined with accumulated configuration symbols from prior transmissions, until the configuration message may be accurately decoded without errors. Thus, the configuration transmission system operates to allow terminals that experience low SNR, (i.e., due to, distance from the transmitter, an obstruction, or any other reason) to receive and combine multiple transmissions of the configuration message so that eventually enough signal power will be received to decode the configuration message to obtain the configuration parameters needed to initialize the terminal.

In one embodiment, the terminal 400 operates as the result of the execution of instructions stored in a memory to perform the functions described herein. For example, the memory may be part of the processing logic 402. The instructions may be stored in the memory during manufacture of the terminal 400. In one embodiment, the instructions are stored on a computer-readable media, such as a floppy disk, hard disk, CDROM, flash memory, or any other type of computer-readable media. The instructions on the computer-readable media may be retrieved and executed by the processing logic 402. In one embodiment, the instructions are downloaded from the computer-readable media into the terminal 400 and stored in the memory for later execution. Thus, in one embodiment, the terminal 400 operates to execute instructions stored on a computer-readable media to perform the functions described herein.

It should be noted that the terminal 400 is just one embodiment and that other addition, changes, deletions, or modifications of the functional elements are possible within the scope of the described embodiments.

Figure 5:
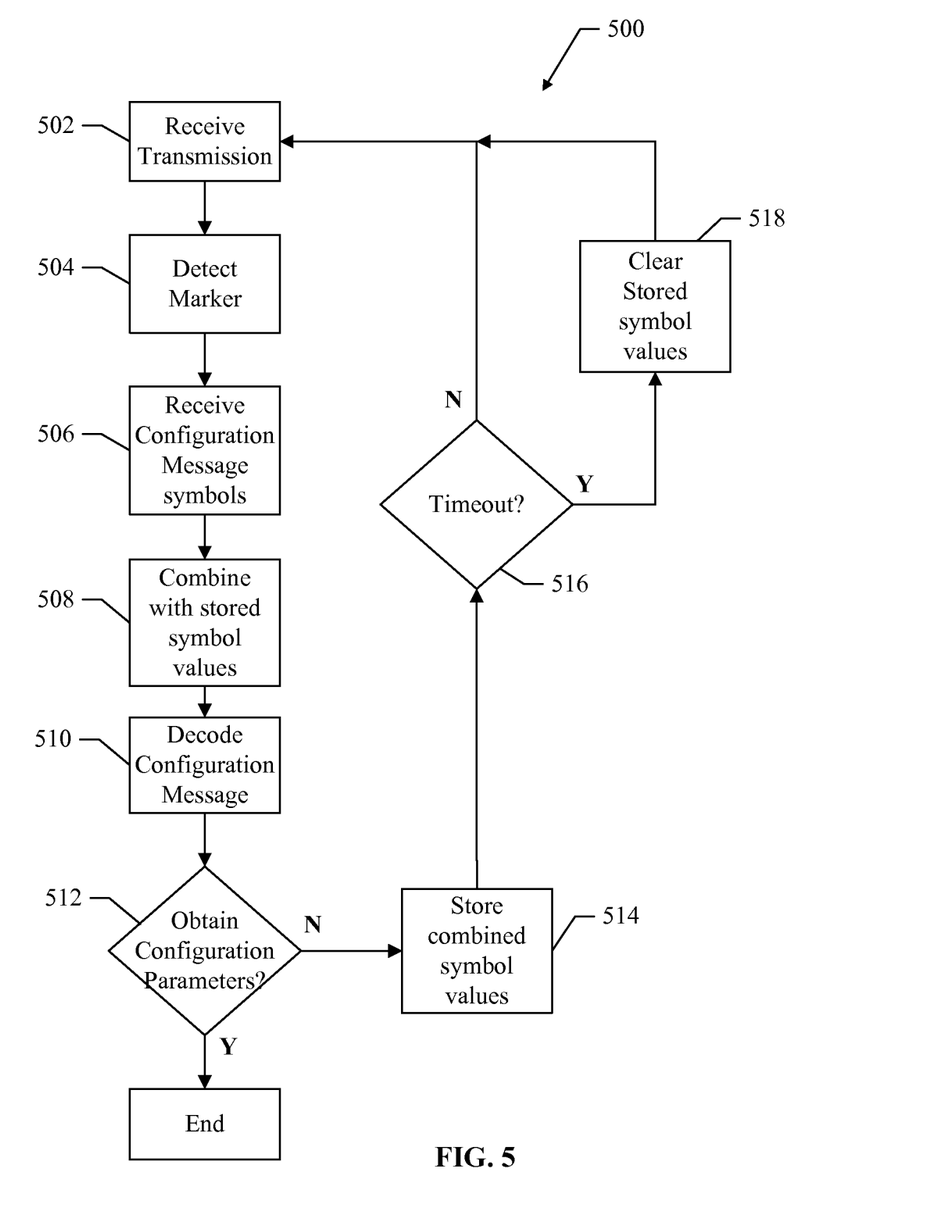
FIG. 5 shows one embodiment of a method for operating a terminal to receive a configuration message transmitted by a server in one embodiment of a configuration transmission system.

FIG. 5 shows one embodiment of a method for operating a terminal to receive a configuration message transmitted by a server in one embodiment of a configuration transmission system, for example, the terminal 400 shown in FIG. 4.

At block 502, at transmission from a wireless network server is received at the terminal. For example, the receiver 400 receives a transmission from a network server, where the transmission comprises a data stream having a plurality of time slots. The transmission also comprises a marker that marks (or identifies) a particular time slot containing a configuration message.

At block 504, the transmission is processed to detect the marker. For example, the marker detection logic 408 processes the transmission to detect the marker. In one embodiment, the marker is an inverted pilot signal that is used in the wireless network.

At block 506, the detected marker is used to receive a configuration message. For example, the processing logic 402 uses the marker to identify and process a particular time slot that contains the configuration message. In one embodiment, the processing logic 402 demodulates symbols in the particular time slot that represent the configuration message.

At block 508, the received symbols are combined with stored symbol values that represent one or more previously received configuration messages. For example, the processing logic 402 retrieves the stored symbol values from the stored configuration values 404. If there are no previously stored values, the processing logic 402 either does not retrieve any stored values or retrieves values that were initialize for use during the first reception of the configuration message. Assuming there are stored symbol values, the received and stored symbol values are inputted to the combiner logic 406 where they are combined into accumulated symbol values using any suitable combining technique. For example, the received symbol values and the stored symbol values are coherently combined to produce the accumulated symbol values.

At block 510, the accumulated symbol values are decoded to obtain the configuration message. For example, the processing logic 402 uses any suitable decoding technique to decode the configuration message from the accumulated symbol values.

At block 512 a test is performed to determine if the configuration message has been decoded without errors. For example, the configuration message may have been encoded using any suitable error detection technique, and the processing logic 402 operates to decode the configuration message by reversing the error detection technique. If there are no errors, then the configuration parameters within the configuration message are stored and used by the processing logic 402 to initialize the terminal to operate on the wireless network. If there are errors, the method proceeds to block 514.

At block 514, the accumulated symbol values are stored as stored symbol values for use in decoding the next reception of the configuration message. For example, the accumulated symbol values are stored at the stored configuration values 404.

At block 516, a test is performed to determine if a timeout has occurred. In one embodiment, when the receiving terminal receives the first marker, a timer is activated that measures the time required to receive the configuration message. For example, the timer may be set to expire in one minute. If the configuration message has not been accurately received and the timer has not expired, the method then proceeds to block 502 where the next transmission of the configuration message is received, and the process of decoding the configuration message to obtain the configuration parameters begins again. If the configuration message has not been accurately received and the timer has expired, then the method proceeds to block 518. In one or more embodiments, if the receive SNR is low, it may take 30 to 60 seconds to accumulate enough symbols to accurately decode the configuration message. However, in most implementation, 5 to 7 seconds of symbol accumulation is sufficient to accurately decode the configuration message.

At block 518, the stored symbol values are cleared. Because the configuration message has not been accurately received during the timing period, clearing the stored symbol values allows the configuration message to be received more quickly, if the configuration parameters have been updated during the current receiving time period. Clearing the stored symbol values prevents old symbol values from being combined with new symbol values. The result is the new symbol values can be accurately received more quickly. The method then proceeds to block 502 where the next transmission of the configuration message is received.

It should be noted that the method 500 describes one embodiment for operating a terminal to receive a configuration message and that changes, additions, deletions, or rearrangements of the method are within the scope of the described embodiments.

A configuration transmission system has been described that operates to efficiently transmit a configuration message to terminals in a wireless network. Accordingly, while one or more embodiments of the antenna control system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method for transmitting a configuration message to a plurality of terminals in a wireless network, the method comprising:
    assigning a slot in a transmission to contain the configuration message, wherein the configuration message comprises system parameters configured to initialize the terminals to operate on the wireless network;
    generating a marker that identifies a location of the slot containing the configuration message in the transmission;
    transmitting the marker to identify the slot containing the configuration message in the transmission to the plurality of terminals;
    transmitting the configuration message in the slot of the transmission using a high data rate so that air link resources are conserved;
    repeating the transmitting of the marker and the transmitting of the configuration message; and
    periodically updating the configuration message,
    wherein
        transmitting the marker comprises transmitting a pilot signal and a phase adjustment to the pilot signal, and
        the phase adjustment inverts the pilot signal so that when the terminals receive the inverted pilot signal the terminals know that the associated time slot contains the configuration message.

2. The method of claim 1, wherein the slot periodically occurs and the method comprises transmitting the configuration message over a plurality of slots.

3. A server that operates to transmit a configuration message to a plurality of terminals in a wireless network, the server comprising:
    processing logic that operates to assign a slot in a transmission from the server to contain the configuration message, wherein the configuration message comprises system parameters configured to initialize the terminals to operate on the wireless network, and wherein the processing logic operates to periodically update the configuration message;
    slot identification logic that operates to generate a marker that identifies a location of the slot containing the configuration message in the transmission; and
    transmitting logic that operates to transmit the marker to identify the slot containing the configuration message in the transmission, and to transmit the configuration message in the slot of the transmission using a high data rate so that air link resources are conserved, wherein the transmitting logic further operates to repeatedly transmit the marker and the configuration message,
    wherein
        the marker comprises a pilot signal and a phase adjustment to the pilot signal, and
        the phase adjustment inverts the pilot signal so that when the terminals receive the inverted pilot signal the terminals know that the associated time slot contains the configuration message.

4. The server of claim 3, wherein the processing logic operates to encode the configuration message using an error detection technique.

5. A server that operates to transmit a configuration message to a plurality of terminals in a wireless network, the server comprising:
    means for assigning a slot in a transmission from the server to contain the configuration message, wherein the configuration message comprises system parameters configured to initialize the terminals to operate on the wireless network;
    means for generating a marker that identifies a location of the slot containing the configuration message in the transmission;
    means for transmitting the marker to identify the slot containing the configuration message in the transmission to the plurality of terminals;
    means for transmitting the configuration message in the slot of the transmission using a high data rate so that air link resources are conserved;
    means for repeatedly transmitting the marker and the configuration message; and
    means for periodically updating the configuration message,
    wherein
        the marker comprises a pilot signal and a phase adjustment to the pilot signal, and
        the phase adjustment inverts the pilot signal so that when the terminals receive the inverted pilot signal the terminals know that the associated time slot contains the configuration message.

6. The server of claim 5, further comprising means for encoding the configuration message using an error detection technique.

7. A non-transitory computer-readable media comprising instructions, which when executed by a processor in a server, operate to transmit a configuration message to a plurality of terminals in a wireless network, the computer-readable media comprising:
    instructions for assigning a slot in a transmission from the server to contain the configuration message, wherein the configuration message comprises system parameters configured to initialize the terminals to operate on the wireless network;
    instructions for generating a marker that identifies a location of the slot containing the configuration message in the transmission;
    instructions for transmitting the marker to identify the slot containing the configuration message in the transmission to the plurality of terminals;
    instructions for transmitting the configuration message in the slot of the transmission using high data rate so that air link resources are conserved;
    instructions for repeatedly transmitting the marker and the configuration message; and
    instructions for repeatedly transmitting the marker and the configuration message,
    wherein
        the marker comprises a pilot signal and a phase adjustment to the pilot signal, and the phase adjustment inverts the pilot signal so that when the terminals receive the inverted pilot signal the terminals know that the associated time slot contains the configuration message.

8. The computer-readable media of claim 7, further comprising instructions for encoding the configuration message using an error detection technique.

9. A method for operating a terminal to receive a configuration message in a wireless network, the method comprising:

detecting a repeatedly transmitted marker that identifies a location of a selected time slot containing a configuration message in a transmission, wherein the configuration message comprises system parameters configured to initialize terminals to operate on the wireless network;

repeatedly receiving symbols representing the configuration message that have been transmitted during the selected time slot using a high data rate so that air link resources are conserved;

combining the symbols with stored symbols to form combined symbol values, where the stored symbols represent prior symbols received from one or more prior transmissions of the configuration message; and decoding the combined symbol values to produce the configuration message comprising the system parameters configured to initialize terminals to operate on the wireless network, wherein
the marker comprises a pilot signal and a phase adjustment to the pilot signal, and
the phase adjustment inverts the pilot signal so that when the terminal receives the inverted pilot signal the terminal knows that the associated time slot contains the configuration message.

10. A terminal for operating in a wireless network, comprising:

a receiver configured to receive a transmission;

marker detection logic configured to detect a repeatedly transmitted marker that identifies a location of a selected time slot containing a configuration message in a transmission, wherein the configuration message comprises system parameters configured to initialize terminals to operate on the wireless network;

wherein the receiver is further configured to repeatedly receive symbols representing the configuration message that have been transmitted during the selected time slot using a high data rate so that air link resources are conserved;

combiner logic configured to combine the symbols with stored symbols to form combined symbol values, where the stored symbols represent prior symbols received from one or more prior transmissions of the configuration message; and processing logic configured to decode the combined symbol values to produce the configuration message comprising the system parameters configured to initialize terminals to operate on the wireless network, wherein
the marker comprises a pilot signal and a phase adjustment to the pilot signal, and
the phase adjustment inverts the pilot signal so that when the terminal receives the inverted pilot signal the terminal knows that the associated time slot contains the configuration message.

* * * * *